United States Patent Office 3,533,521
Patented Oct. 13, 1970

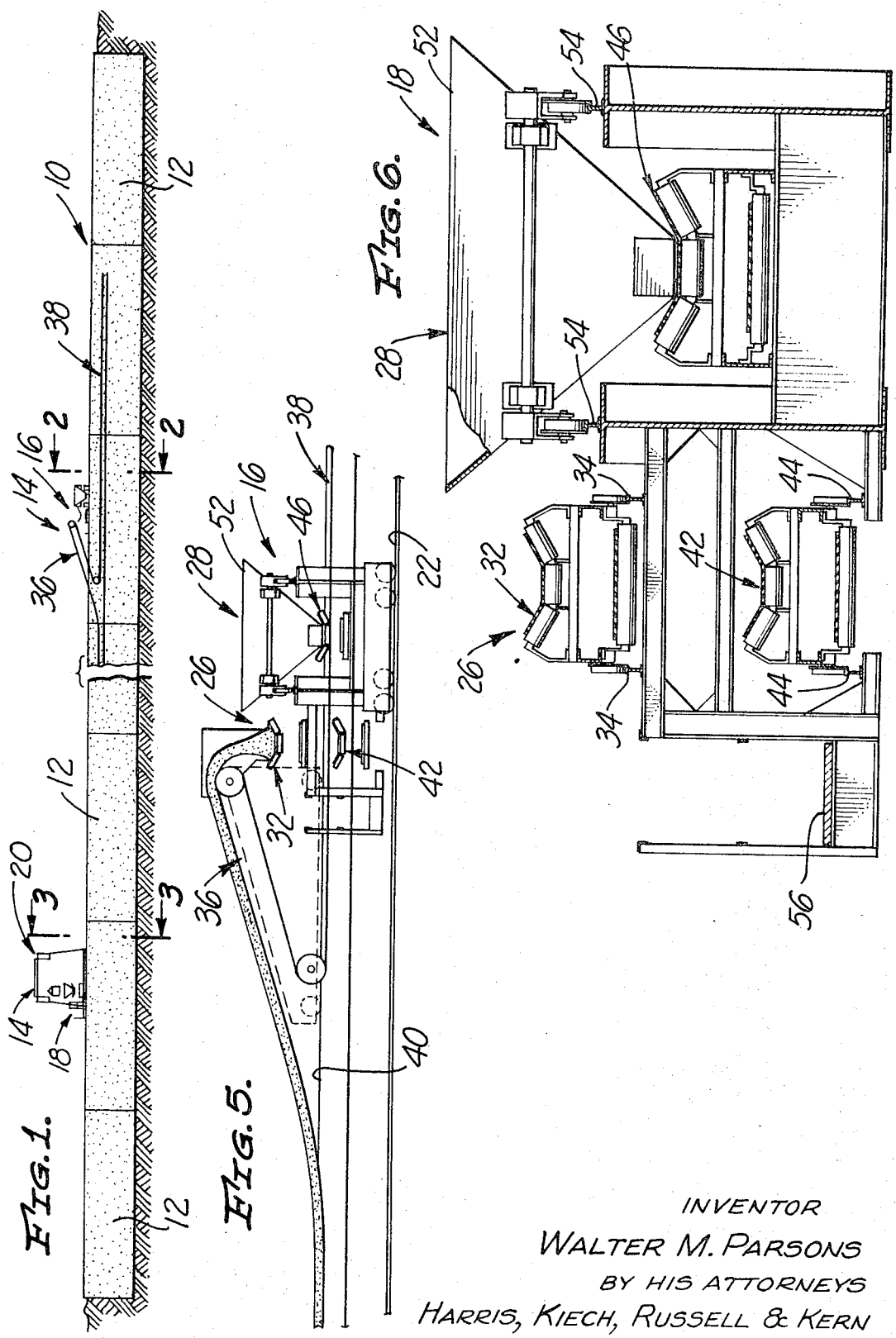

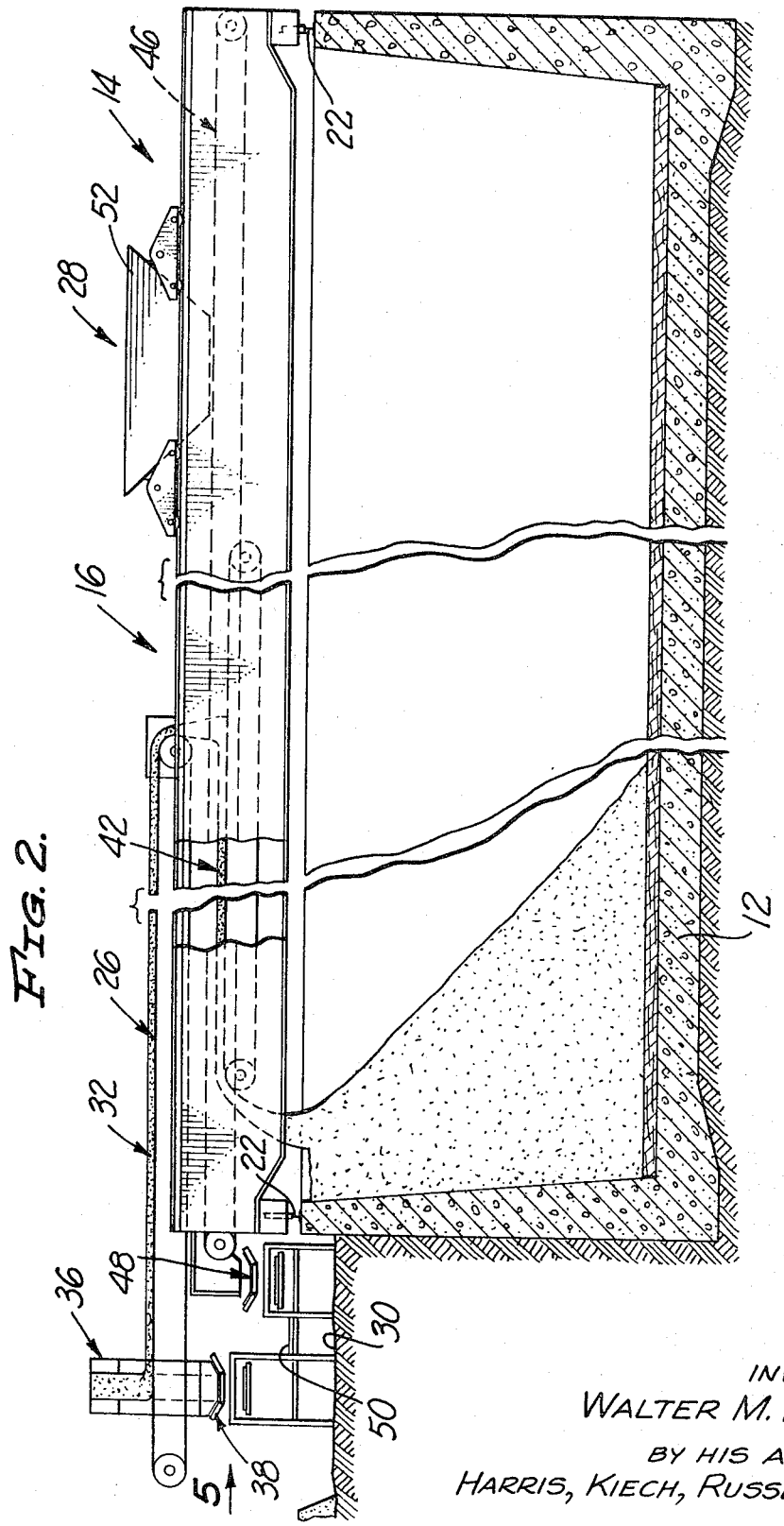

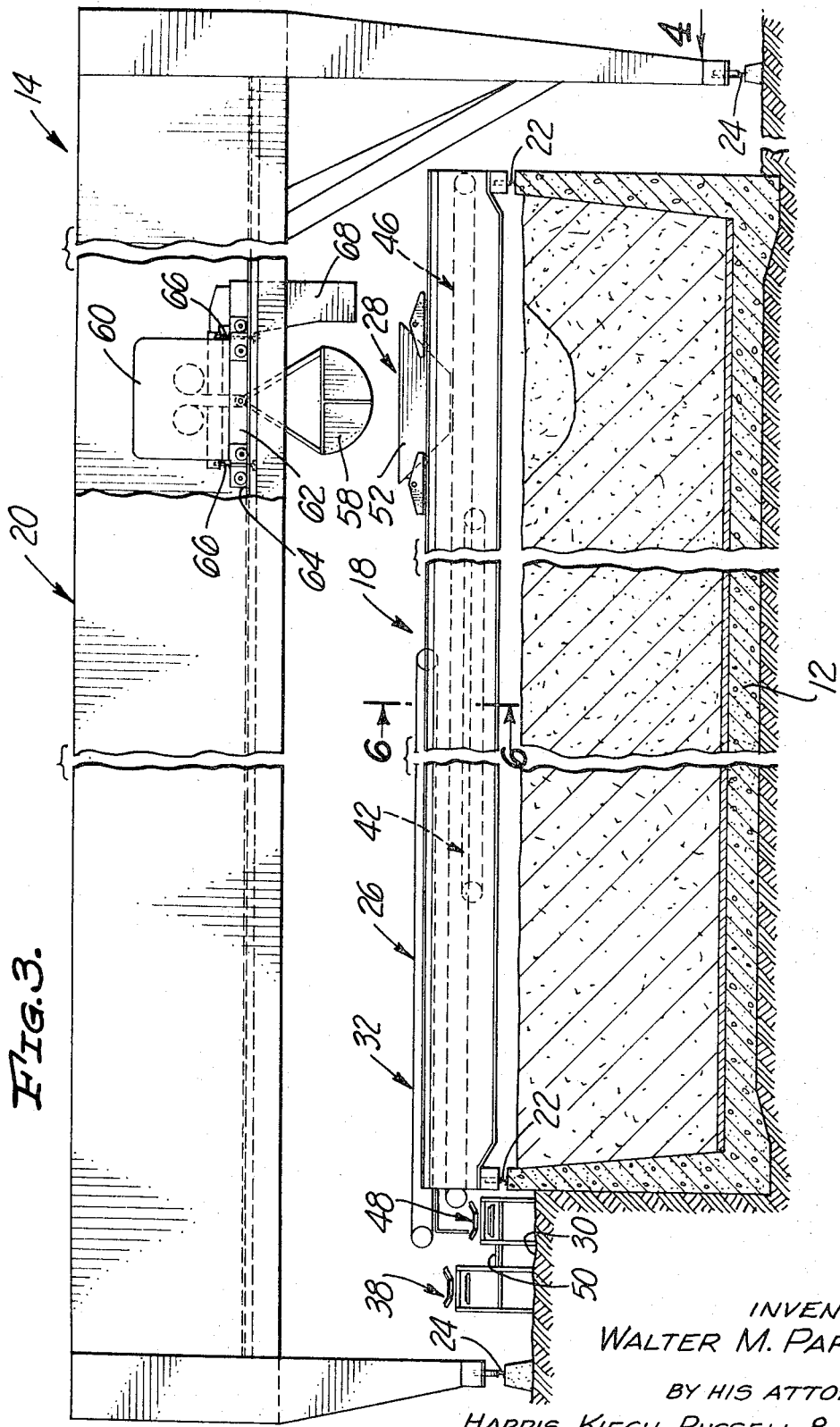

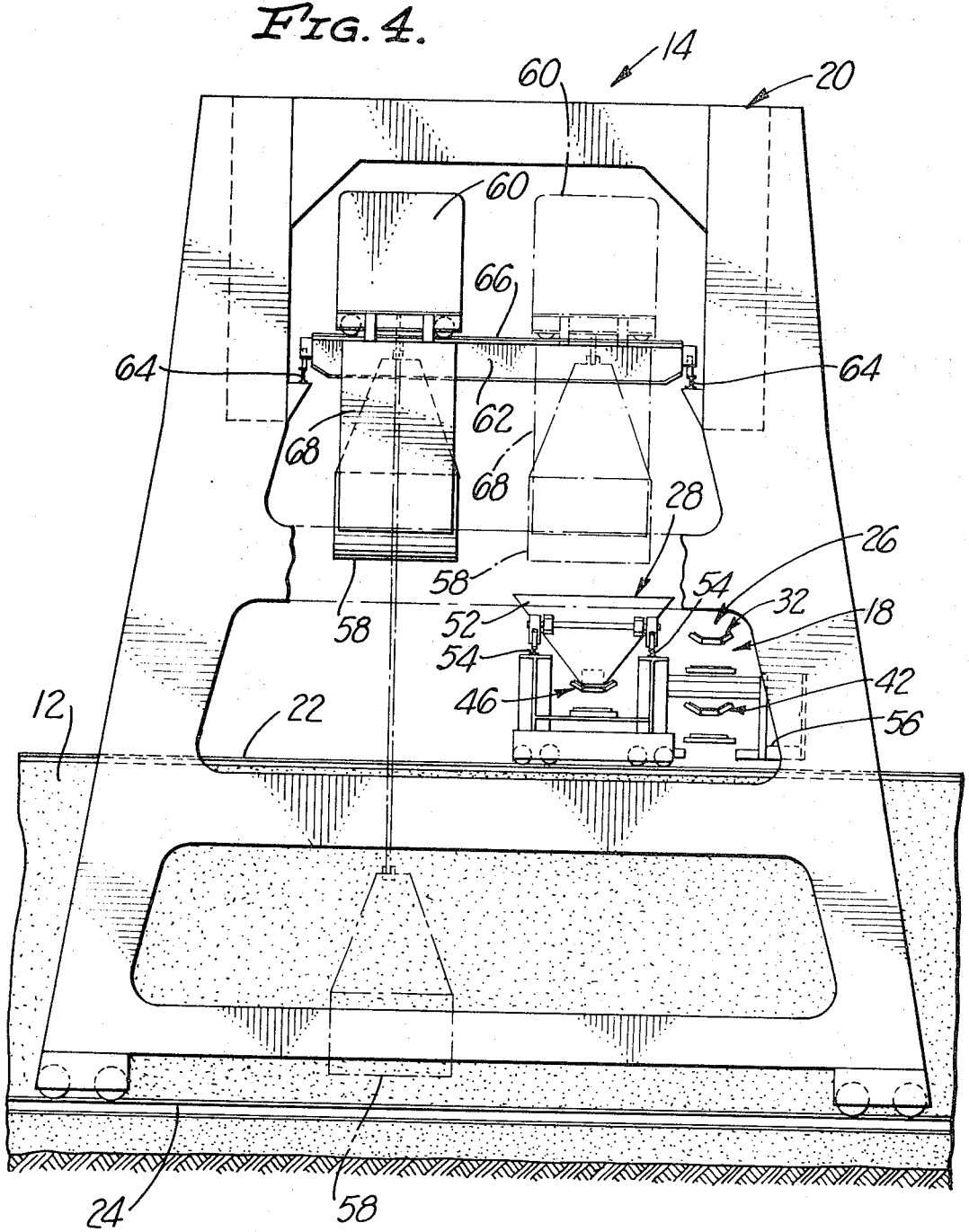

3,533,521
APPARATUS FOR DEPOSITING MATERIAL IN AND REMOVING IT FROM ELONGATED PROCESSING ZONES
Walter M. Parsons, San Marino, Calif., assignor to American Hoist & Derrick Company, St. Paul, Minn., a corporation of Minnesota
Original application Dec. 11, 1967, Ser. No. 689,393, now Patent No. 3,471,041, dated Oct. 7, 1969. Divided and this application Feb. 24, 1969, Ser. No. 828,031
Int. Cl. B65g 65/38
U.S. Cl. 214—17                    4 Claims

ABSTRACT OF THE DISCLOSURE

An apparatus for depositing ore or other material in and removing it from a series of elongated leaching vats or tanks arranged end to end. The apparatus comprises three traveling structures or units above and movable longitudinally of the series of leaching tanks, two of the traveling structures being bridges movable along a common track, and the third being a gantry located at a higher elevation than the bridges and movable along a different track. The two bridges are equipped with loading conveyor systems for uniformly depositing the material in the leaching tanks, and are equipped with unloading conveyor systems for transporting the material to one side or longitudinal edge of the series of tanks. Each unloading conveyor system includes a hopper movable transversely of the series of tanks. The gantry carries a clamshell for taking material from the tanks and for placing it in the hopper on either bridge, so that the gantry and either of the bridges may be used to remove material from one of the tanks while the other bridge may simultaneously be used to deposit material in another of the tanks. The clamshell is carried by hoisting equipment on a traveling crane mounted on the gantry for movement transversely of the series of tanks. With this arrangement, the clamshell may take material from one of the tanks and place it in the hopper on one of the first two bridges mentioned without relative movement of the gantry and the corresponding bridge longitudinally of the series of tanks. The traveling crane on the gantry and the hopper on the bridge used in conjunction with the gantry move transversely of the series of tanks concurrently as material is removed.

CROSS-REFERENCE TO RELATED APPLICATION

This application is a division of my copending application Ser. No. 689,393, filed Dec. 11, 1967, now Pat. No. 3,471,041, Oct. 7, 1969.

BACKGROUND OF THE INVENTION

The invention relates in general to an apparatus for depositing material in and removing it from an elongated processing zone. For example, the processing zone may be a series of elongated leaching vats or tanks arranged end to end and used to leach ores, such as low-grade copper ores, or other materials having components to be reclaimed. However, the processing zone may have other purposes, e.g., it may simply be used for material storage. Consequently, the term is not to be regarded as limited to any specific operation or use.

The invention contemplates an apparatus for the foregoing or analogous purposes which comprises a system of traveling structures or units movable longitudinally of the elongated processing zone and adapted to charge or load the zone with the material to be processed and to reclaim or unload the material from the zone after processing. Preferably, the traveling system is capable of simultaneously depositing the material in one portion of the elongated processing zone and removing processed material from another portion thereof.

SUMMARY AND OBJECTS OF INVENTION

With the foregoing background in mind, a primary object of the invention is to provide a traveling system, for simultaneously depositing material in and removing it from an elongated processing zone, which includes only three traveling units movable longitudinally of the processing zone, one of the three operating in conjunction with either of the other two to unload material from the processing zone while the third simultaneously charges a different portion of the processing zone.

More particularly, the invention comprises and an important object thereof is to provide a traveling system, for simultaneously depositing material in and removing it from an elongated processing zone, which includes: three traveling units above and movable longitudinally of the processing zone; two of the traveling units being at the same elevation and the third being at a different elevation; loading means carried by each of the first two traveling units and movable relative thereto transversely of the processing zone for depositing material in the processing zone; unloading means carried by each of the first two traveling units and movable relative thereto transversely of the processing zone for transporting material to a longitudinal edge of the processing zone; elevating means carried by the third traveling unit for taking material from the processing zone and for placing it on the unloading means on either of the first two traveling units; whereby the third traveling unit and either of the first two traveling units may be used to remove material from the processing zone while the other of the first two traveling units is used to simultaneously deposit material in the processing zone. Preferably, the first two traveling units mentioned are bridges movable longitudinally of the processing zone along a common track or track means, while the third traveling unit is a gantry extending vertically above the two bridges and movable longitudinally of the processing zone along a separate track or track means.

Another important object of the invention is to mount the elevating means on the gantry for movement relative thereto longitudinally of the processing zone, whereby the elevating means may take material from the processing zone and place it on the unloading means on either of the two bridges without relative movement of the gantry and such bridge longitudinally of the processing zone. This is an important feature of the invention since it minimizes the time required to pick up a load of material from the processing zone and to transfer it longitudinally of the processing zone to the unloading means on the particular bridge being used in conjunction with the gantry.

Preferably, the unloading means carried by each bridge comprises an unloading conveyor or conveyor means movable transversely of the processing zone to a longitudinal edge thereof. The elevating means carried by the gantry deposits material from the processing zone in an unloading hopper or hopper means on the corresponding bridge above the corresponding unloading conveyor. An important object of the invention in this connection is to mount the unloading hopper on each bridge and the elevating means on the gantry for concurrent movement transversely of the processing zone. With this arrangement, the elevating means on the gantry may take material from the processing zone and place it in the unloading hopper on the corresponding bridge without any relative movement of the elevating means and the unloading hopper transversely of the processing zone. This is another important feature of the invention since it further minimizes the time required to transfer a load of material from the processing zone to the unloading means on the particular bridge used in conjunction with the gantry to remove material from the processing zone.

A further important object of the invention is to provide the gantry with a traveling bridge crane which is movable transversely of the direction of movement of the gantry, i.e., which is movable transversely of the elongated processing zone, and which carries the elevating means for taking material from the processing zone, the elevating means being movable relative to this bridge crane in the direction of longitudinal movement of the gantry. This construction provides the hereinbefore-discussed compound horizontal movement of the elevating means, i.e., movement of the elevating means both longitudinally and laterally of the elongated processing zone.

The loading means and the unloading means carried by each of the bridges movable longitudinally of the elongated processing zone are preferably located side by side and spaced apart longitudinally of the processing zone. With this construction, the loading means on each of these bridges may be used while the unloading means thereon is inoperative, and the unloading means on each of these bridges may be used in conjunction with the elevating means on the gantry while the loading means thereon is inoperative.

Still another object of the invention is to provide a loading means on each of the bridges movable longitudinally of the processing zone which includes a reversible shuttle conveyor extending transversely of the processing zone for depositing material uniformly thereacross, together with a feed conveyor extending transversely of the processing zone for feeding material to the shuttle conveyor. An additional object in this connection is to provide a feed conveyor which is movable transversely of the processing zone, relative to the corresponding bridge, between operative and inoperative positions, being in its inoperative position when the unloading means on the corresponding bridge is in use.

The foregoing objects, advantages, features and results of the invention, together with various other objects, advantages, features and results thereof which will be evident to those skilled in the art to which it relates in the light of this disclosure, may be achieved with the exemplary embodiment of the invention illustrated in the accompanying drawings and described in detail hereinafter.

DESCRIPTION OF DRAWINGS

FIG. 1 is a semidiagrammatic elevational view illustrating a traveling system of the invention for depositing material in and removing it from an elongated processing zone;

FIG. 2 is an enlarged, semidiagrammatic sectional view taken as illustrated by the arrowed line 2—2 of FIG. 1 and illustrating a bridge of the invention in use to deposit material in the processing zone;

FIG. 3 is an enlarged, semidiagrammatic view taken as indicated by the arrowed line 3—3 of FIG. 1 and illustrating a bridge and a gantry of the invention in use to remove material from the processing zone;

FIG. 4 is an enlarged, semidiagrammatic view, partially in elevation and partially in section, taken as indicated by the arrow 4 of FIG. 3;

FIG. 5 is an enlarged, semidiagrammatic view, partially in section and partially in elevation, taken as indicated by the arrow 5 of FIG. 2; and FIG. 6 is an enlarged, sectional view taken as indicated by the arrowed line 6—6 of FIG. 3 of the drawings.

DETAILED DESCRIPTION OF PREFERRED EMBODIMENT OF INVENTION

Referring initially to FIG. 1 of the drawings, illustrated therein in elevation is an elongated material-processing zone 10 in which any desired material may be subjected to any suitable process. For convenience in disclosing the invention, the processing zone 10 will be considered hereinafter as suitable for leaching such materials as ores, e.g., low-grade copper ores. However, the invention is not limited thereto.

With the foregoing exemplary utilization of the invention in mind, the processing zone 10 may comprise a series of elongated, rectangular leaching vats or tanks 12 arranged end to end. For example, the leaching system may operate on a fourteen-day cycle, in which event there are preferably fourteen of the leaching tanks 12 in end-to-end relation. The traveling system of the invention, designated generally by the numeral 14, may be used to deposit the material to be leached in one of the tanks 12 each day while simultaneously removing leached material from another of the tanks, this process being repeated daily until the entire series of fourteen tanks has been filled and emptied, whereupon the entire cycle is repeated. As shown in FIG. 3 of the drawings, leaching tanks 12 are set in the ground in a location wherein the ground slopes laterally so that the ground level on one side of each tank is located adjacent the top thereof while the ground level on the other side is located adjacent the bottom thereof. However, such a setting for the leaching tanks 12 is not necessary to the present invention.

The traveling system 14 of the invention includes as its basic components three traveling structures or units 16, 18 and 20 all movable longitudinally of the series of leaching tanks 12. The traveling units 16 and 18 are located at the same elevation and are preferably bridges running on a common track or track means comprising spaced, parallel rails 22 carried by the longitudinal edges of the leaching tanks. The traveling unit 20 is located at a higher elevation than the bridges 16 and 18 and is preferably a gantry, shown as movable along a longitudinal track or track means comprising spaced, parallel rails 24 set on the ground adjacent and spaced laterally outwardly from the longitudinal edges of the leaching tanks 12. Because of the lateral slope of the ground in the particular leaching-tank environment illustrated, the legs of the gantry 20 are of different lengths, as best shown in FIG. 3 of the drawings. However, this is in no way essential to the invention.

As hereinbefore outlined, and as will be described in more detail hereinafter, one of the bridges 16 and 18 is used to deposit material in one of the leaching tanks 12 while the other of the bridges and the gantry 20 cooperate to remove material from another of the leaching tanks. To achieve this, each of the bridges 16 and 18, which are identical, is provided with a loading means for depositing material in any of the leaching tanks 12, and an unloading means 28 for transporting material to one side or longitudinal edge 30 of the series of leaching tanks. The loading means 26 and the unloading means 28 on each of the bridges 16 and 18 extend laterally of the series of leaching tanks 12 and are positioned in side-by-side relation.

The loading means 26 on each of the bridges 16 and 18 includes a feed conveyor 32 which is preferably a belt conveyor having an upper run supported by troughing rolls, as best shown in FIG. 6. The feed conveyor 32 is movable transversely of the length of the series of leaching tanks 12 on rails 34, FIG. 6, between an operative position, shown in FIG. 2, and an inoperative position, shown in FIG. 3. The particular bridge 16 or 18 being used to deposit material in one of the leaching tanks 12 has the feed conveyor 32 thereon displaced laterally of the series of leaching tanks into its operative position, as shown in FIG. 2. This feed conveyor receives a stream of material from a tripper 36, best shown in FIG. 5, associated with the upper run of a supply conveyor 38 of the troughed belt type which extends the full length of the series of leaching tanks 12 along the side 30 thereof. The tripper 36 is carried by longitudinal tracks 40 and is movable therealong with the particular bridge 16 or 18 being used to deposit material in one of the leaching tanks 12. For example, the tripper 36 may be suitably connected, in a manner not shown, to that one of the two bridges 16 and 18 which is being used to load material into one of the leaching tanks 12. When the other bridge is to be used to perform a loading function, the tripper 36 may be disconnected from the first and connected to the second, or otherwise caused to move in unison therewith longitudinally of the series of tanks 12.

The loading means 26 on each of the bridges 16 and 18 includes, in addition to the corersponding feed conveyor 32, a reversible shuttle conveyor 42 extending laterally of the series of leaching tanks 12 and movable laterally thereof on rails 44, FIG. 6. The shuttle conveyor 42 may comprise a conveyor belt the upper run of which is carried by troughing rolls, as shown in FIG. 6. As will be clear from FIG. 2 of the drawings, when the fede conveyor 32 on a particular one of the bridges 16 and 18 is in its operating position to receive material from the tripper 36 associated with the supply conveyor 38, it deposits such material on the shuttle conveyor 42. By reversing the direction of movement of the shuttle conveyor 42 and/or displacing the shuttle conveyor laterally of the length of the series of leaching tanks 12 in one direction or the other, the material on the feed conveyor 32 can be distributed uniformly across the width of the particular leaching tank being charged or loaded. It is thought that the manner in which this may be accomplished will be clear from FIG. 2 of the drawings.

The unloading means 28 on each of the bridges 16 and 18 comprises an unloading conveyor 46, best shown in FIGS. 3 and 6, which extends laterally of the length of the series of leaching tanks 12 and which is adapted to discharge onto a takeaway conveyor 48 extending longitudinally of the series of leaching tanks 12 along the side 30 thereof. As shown in FIG. 3, the takeaway conveyor 48 parallels and is spaced from the supply conveyor 38, there preferably being a walkway 50 therebetween. The unloading conveyor 46 is preferably a belt having its upper run supported by troughing rolls, as shown in FIG. 6. A similar construction is preferably used for the supply and takeaway conveyors 38 and 48.

In addition to the unloading conveyor 46, the unloading means 28 comprises a hopper or hopper means 52 above the unloading conveyor 46 for depositing a uniform layer of material thereon. The hopper 52 is mounted on a track or track means comprising spaced, parallel rails 54, FIG. 6, extending transversely of the length of the series of leaching tanks 12. With this construction, the hopper 52 may be located in any desired transverse position relative to a particular leaching tank 12 being unloaded, the reason for this being discussed in more detail hereinafter in describing the structure and operation of the gantry crane 20. Also, when the loading means 26 on a particular one of the bridges 16 and 18 is in use, the corersponding hopper 52 is located in an inoperative, stored position, shown in FIG. 2 of the drawings.

In addition to the loading means 26 and the unloading means 28, each of the bridges 16 and 18 preferably carries a walkway 56, FIG. 6, which parallels the corresponding loading and unloading means and which permits access to any components thereof requiring service or other attention.

The gantry 20 operates in concert with either the bridge 16 or the bridge 18 to take material from any one of the leaching tanks 12 and deposit it on the takeaway conveyor 48. Considering how this is accomplished, the gantry 20 carries an elevating means which preferably comprises a clamshell 58 connected to a suitable hoisting means 60 adapted to lower the clamshell into one of the leaching tanks 12 to pick up a load of the material therein and to raise the clamshell and its load to a level above the hopper 52 on the bridge 16 or 18 being used with the gantry 20. The hoisting means 60 is carried by a relatively small bridge crane 62, best shown in FIG. 4, which is carried by the gantry 20 and which is movable relative thereto laterally of the length of the series of leaching tanks 12 (and thus laterally of the direction of movement of the gantry along its rails 24) along a track or track means comprising spaced, parallel rails 64 extending laterally of the series of leaching tanks. The hoisting means 60, in turn, is movable relative to the bridge crane 62, in the same direction as the direction of movement of the gantry 20, along a track or track means comprising spaced, parallel rails 66, FIGS. 3 and 4.

Depending from and supported by the hoisting means 60 is an operator's cab 68 from which the operation of the gantry 26, the bridge 16 or 18 being used in conjunction with the gantry, the corresponding hopper 52, the clamshell 58, the hoisting means 60, the bridge crane 62, and the position of the hoisting means on this bridge crane, may all be controlled. Such centralized control from the operator's cab 68 may be accomplished in various ways which will be apparent to those skilled in the art so that no detailed disclosure herein is necessary.

Considering the manner in which the gantry 20 operates in conjunction with one or the other of the bridges 16 and 18 to remove material from any of the leaching tanks 12, the gantry and the bridge 16 or 18 being used therewith are located in the relative positions shown in FIG. 4 and are maintained in such relative positions as they are moved longitudinally along their respective rails 24 and 22, as removal of material from a particular leaching tank 12 being emptied progresses longitudinally of such tank. Also, as shown in FIG. 3, the particular hopper 52 in use and the bridge crane 62 carrying the clamshell 58 are maintained opposite each other as removal of material from a particular leaching tank 12 progresses laterally thereof. Such synchronized longitudinal movement of the gantry 20 and the bridge 16 or 18 being used in conjunction therewith, and such synchronized lateral movement of the hopper 52 and the bridge crane 62 on the gantry, are achieved manually from the operator's cab 68, or automatically in any suitable manner.

Under the foregoing conditions, it will be apparent that after the clamshell 58 has picked up a load of material from a particular point in one of the leaching tanks 12 and has elevated such load to a level above the corresponding bridge 16 or 18, it is merely necessary to displace the hoisting means 60 longitudinally of the series of leaching tanks 12 along its rails 66 until the clamshell is over the corresponding hopper 52, whereupon the load may be dumped into such hopper for uniform feeding thereby onto the corresponding unloading conveyor 46. In other words, the only horizontal movement of the clamshell which is required is from the solid-line position of FIG. 4 to the broken-line position to the right of such solid-line position. The same holds as removal of material from the leaching tank 12 being emptied progresses longitudinally of such tank, because of the concurrent longitudinal movement of the gantry 20 and the bridge 16 or 18 being used therewith, and also holds as removal of material progresses laterally of the tank being emptied, because of the concurrent lateral movement of the bridge crane 62 and the corresponding hopper 52. Thus, regardless of the location in a particular leaching tank 12 from which material is being removed, the horizontal movement required of the clamshell 58 is only that between the solid-line position of FIG. 4 and the broken-line position to the right thereof. This minimization of the horizontal movement required of the clamshell 58 in picking up a load and in dumping it into the hopper 52 greatly reduces the time required to employ one of the leaching tanks 12, which is an important feature of the invention and which is the result of concurrent longitudinal movement of the gantry 20 and the bridge 16 or 18 being used therewith, in combination with concurrent lateral movement of the bridge crane 62 and the hopper 52.

It is thought that the over-all operation of the traveling system 14 of the invention will be clear from the foregoing so that only a brief summary is required at this point. As will be apparent, one of the bridges 16 and 18 is used to fill a leaching tank 12 while the gantry 20 and the other of the bridges 16 and 18 are used simultaneously to empty another leaching tank. The tripper 36 operates in conjunction with and moves longitudinally in conjunction with the bridge 16 or 18 being used for loading or charging purposes, the feed conveyor 32 of such bridge crane being in its operative position and the hopper 52 thereof being in its inoperative position. The feed conveyor 32 of the bridge 16 or 18 which is being used in conjunction with the gantry 20 for unloading purposes is in its inoperative position, and the unloading conveyor 46 of such bridge discharges onto the takeaway conveyor 48.

Since the two bridges 16 and 18 run on the same rails 22, it is periodically necessary to transfer the loading and unloading operations back and forth between the two bridges. In other words, if the bridge 16 is being used for charging certain of the leaching tanks 12 and the bridge 18 and the gantry 20 are being used for emptying others of the leaching tanks, it will ultimately be necessary to switch the bridge 18 over to performing a loading or charging function and to use the bridge 16 in connection with the gantry 20 in performing an unloading function. Just where this changeover takes place longitudinally of the series of leaching tanks 12 depends on the particular tank loading and unloading pattern being used.

As will be apparent from the foregoing, the traveling system 14 requires a minimum number of basic components by making either of the bridges 16 and 18 usable with the gantry 20 to perform an unloading function, while simultaneously using the other bridge for loading purposes. Further, horizontal movement of the clamshell 58 is minimized because of the hereinbefore-described interrelationship between the clamshell, the hopper 52, the bridge crane 62 and the hoisting means 60.

Although an exemplary embodiment of the invention has been disclosed herein for purposes of illustration, it will be understood that various changes, modifications and substitutions may be incorporated in such embodiment without departing from the spirit of the invention as defined in the claims appearing in the next section of this specification.

I claim as my invention:

1. In an apparatus for removing material from an elongated processing zone, the combination of:
   (a) upper and lower traveling units movable longitudinally of said processing zone;
   (b) unloading means carried by said lower traveling unit and movable relative thereto transversely of said processing zone for transporting material from said processing zone to a longitudinal edge thereof;
   (c) elevating means carried by said upper traveling unit for taking material from said processing zone and for placing it on said unloading means on said lower traveling unit;
   (d) means mounting said elevating means on said upper traveling unit for movement relative thereto longitudinally of said processing zone;
   (e) whereby said elevating means may take material from said processing zone and place it on said unloading means on said lower traveling unit without relative movement of said upper and lower traveling units longitudinally of said processing zone;
   (f) means mounting said elevating means on said upper traveling unit for movement relative thereto transversely of said processing zone; and
   (g) whereby said elevating means may take material from said processing zone and place it on said unloading means on said lower traveling unit without relative movement of said elevating means and said unloading means transversely of said processing zone.

2. An apparatus as defined in claim 1 wherein said unloading means includes conveyor means movable relative to said lower traveling unit transversely of said processing zone, and includes hopper means above said conveyor means and movable relative to said lower traveling unit transversely of said processing zone, whereby said elevating means may take material from said processing zone and place it in said hopper means on said lower traveling unit without relative movement of said elevating means and said hopper means transversely of said processing zone.

3. An apparatus as defined in claim 1 including means supporting said upper and lower traveling units for movement longitudinally of said processing zone independently of each other.

4. An apparatus according to claim 3 including means for longitudinally moving said upper and lower traveling units in unison.

References Cited

UNITED STATES PATENTS

| | | | |
|---|---|---|---|
| 1,348,599 | 8/1920 | Stuart | 198—56 XR |
| 1,396,193 | 11/1921 | Godin | 214—87 XR |
| 2,801,014 | 7/1957 | Colson | 198—77 XR |
| 2,827,180 | 3/1958 | Bartenfeld | 214—89 XR |
| 3,294,491 | 12/1966 | Brown | 214—17.84 XR |

ROBERT G. SHERIDAN, Primary Examiner